March 25, 1969    P. J. GIELISSE ET AL    3,435,399
THERMISTOR DEVICE AND METHOD OF PRODUCING SAID DEVICE
Filed April 19, 1966    Sheet 1 of 2

INVENTORS
PETER J. GIELISSE
MANFRED DOSER
BY
*Harold Holt*

ATTORNEY

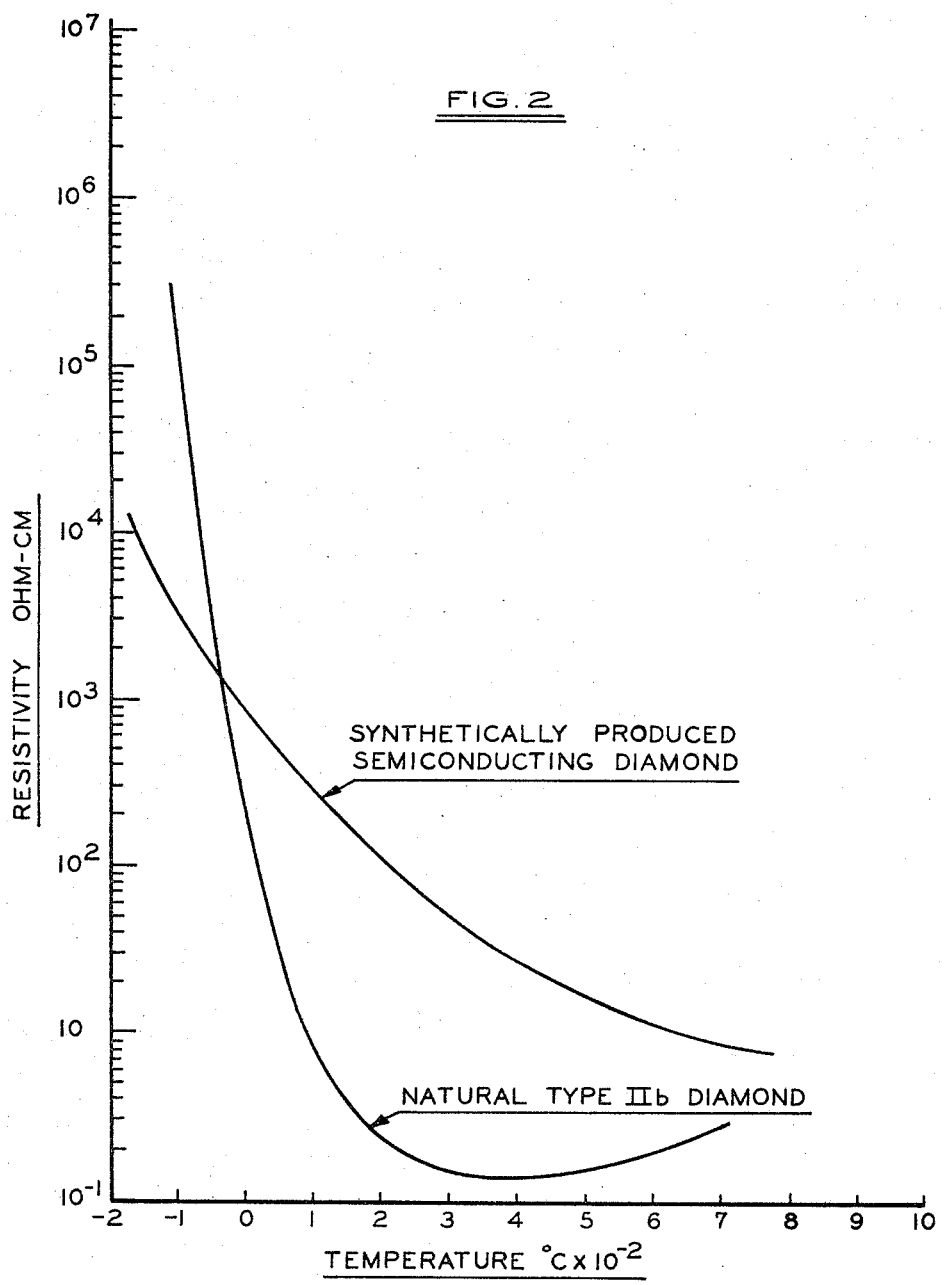

3,435,399
THERMISTOR DEVICE AND METHOD OF PRODUCING SAID DEVICE

Peter J. Gielisse, Bloomfield Hills, and Manfred Doser, Edmore, Mich., assignors to General Electric Company, a corporation of New York
Filed Apr. 19, 1966, Ser. No. 543,649
Int. Cl. H01c 7/04
U.S. Cl. 338—22　　16 Claims

ABSTRACT OF THE DISCLOSURE

A thermistor device in which the resistance material is a semiconducting single crystal diamond. The thermistor has a coefficient of resistivity in excess of 0.05 over a continuous temperature range including room temperature in excess of 500° C. The semiconducting diamond crystal is doped with boron, aluminum or beryllium, homogeneously distributed throughout the crystal, and is bonded by ohmic contact to two electrically conductive leads.

---

Figure 1:
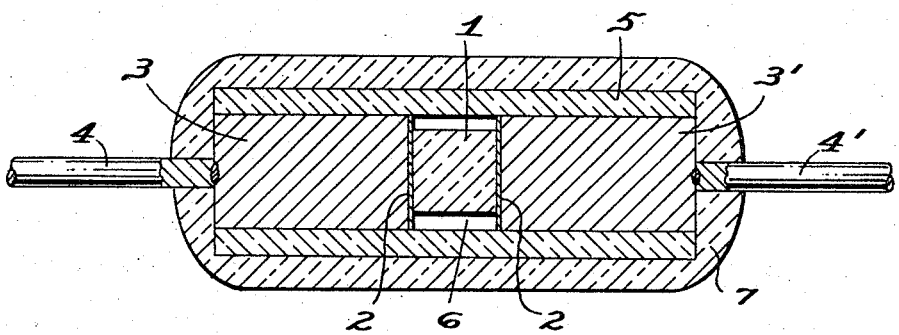

This invention relates to a thermistor, displaying a coefficient of resistivity over a useful continuous temperature range considerably in excess of any presently known thermistor device, in which single crystal diamond is the resistance material.

Thermistors, or thermally sensitive resistors, are well known. They are prepared from a variety of semiconductor polycrystalline or single crystal materials, usually compressed metallic oxides, all of which display in one way or another a change of resistance with an increase in temperature in the negative, or in some cases in the positive, sense. Prior attempts have been made to utilize naturally occurring semiconducting diamond in thermistors. See, for example, Rodgers, G. B. and Raal, F. A., Rev. Sci. Instr. vol. 31, page 663 (1960). However, the supply of such naturally occurring diamonds, the semiconducting properties of which are for all practical purposes fixed, is extremely limited and drastically reduces their commercial utility in thermistor devices. Furthermore, and more significantly, naturally occurring diamond has never demonstrated useful thermistor characteristics over a temperature range materially greater than known thermistors. There is no known single thermistor device available today which operates over a continuous temperature span greater than about 450° C.

It is an object of the present invention to provide a unique thermistor device capable of extending by as much as two to three times the effective thermal operating range of thermistors. It is an additional object of the present invention to provide a single thermistor device capable of continuous operation over temperatures ranging from cryogenic, that is from approximately 10° K., to temperatures as high as or possibly higher than 800° C. or over a total range as great as 1000° C. or, in some instances, even greater. It is still an additional object of the present invention to provide such a thermistor in which the resistivity is nearly a linear function of temperature over considerable portions of its operating ranges.

It is a further object of the present invention to provide a process for producing from a single materials system a thermistor device with a wide range of temperature sensitivity, response, and resistivity as well as extreme high- or low-temperature stability.

We have discovered that the foregoing and other objects of the invention may be achieved in a thermistor, possessing a negative temperature coefficient of resistitvity, the sensing element of which is made from a synthetically produced semiconducting single crystal diamond which is grown under carefully controlled conditions and into which very small proportions of a dopant material are introduced into the host crystal. The resistivity of the crystals may range from as low as $10^{-2}$ ohm cm. to as high as $10^{13}$ ohm cm. A single semiconducting diamond crystal typically changes about 500,000 ohms over the operating temperature range of the present thermistors. The thermistors are capable of operation over a temperature range from approximately minus 260° C. to a high as 800° C. and above. This result is particularly unusual in view of the fact that naturally occurring semiconducting diamond, known as Type IIb, has heretofore exhibited a useful maximum operating temperature of about 350° C. The thermistors of the present invention possess commercially useful temperature coefficients of resistivity representing the percent change of resistivity per degree C., over a temperature span of at least 500° C. to, in some cases, in excess of 1000° C. A commercially useful temperature coefficient of resistivity is generally greater than 0.05% and in most cases greater than 0.1%. Insofar as is known, no thermistor characteristics of this magnitude have ever been previously produced from any available semiconductor material.

Figure 3:
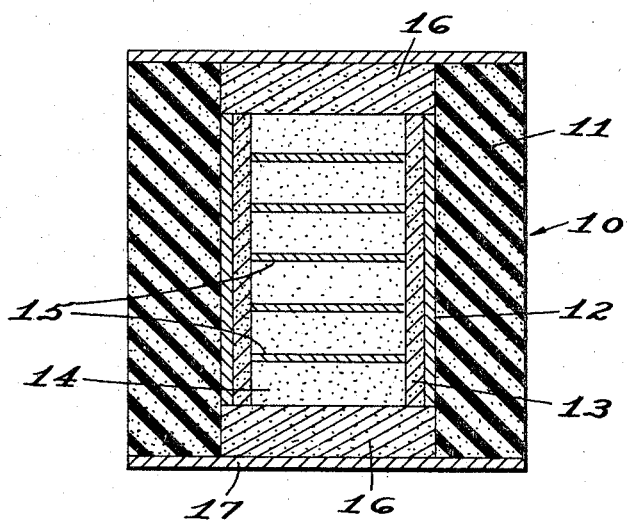

The invention will be better undrstood from the following description taken in connection with the accompanying drawing in which FIGURE 1 is a cross-sectional view of a thermistor device of the invention;

FIGURE 2 illustrates the change of resistivity of naturally occurring Type IIb diamond as compared with a representative semiconducting diamond of the invention over an approximately 1000° C. temperature span; and FIGURE 3 is a cross-sectional view of a typical reaction vessel used to prepare single crystal semiconducting diamond of the invention.

In its preferred form, the thermistor of the invention comprises a semiconducting single crystal diamond, two conductive "headers" bonded to opposite surfaces of the single crystal, two electrically conductive leads attached to the headers and a heat-resistant envelope surrounding and sealing the resistance element and leads. One such thermistor is illustrated in FIG. 1 in which a diamond 1 substantially cubic in shape is bonded across opposite faces thereof by bonding material 2 to headers 3, 3'. The headers are in turn welded to electrically conductive leads 4, 4'. Diamond 1 and headers 3, 3' are encased in a high temperature glass envelope 5 which also seals off a non-oxidizing atomsphere 6 for the diamond 1. A refractory outer casing 7, which may be a refractory such as that sold under the trademark Pyroceram, envelopes the entire assembly. The thermistor device shown in FIG. 1 is greatly enlarged for clarity. Normally, a side of the cube-shaped diamond 1 will range from 250 to 300 microns in size.

The header material which may, for example, be the metal molybdenum or tungsten, effectively dissipates heat and as such acts as a heat sink during operation of the thermistor in certain applications. Molybdenum or tungsten bonds quite effectively to the glass or other refractory envelope in which the thermistor is enclosed and provides a match between the coefficient of expansion of the metal lead and glass in such a fashion that a satisfactory seal is obtained and maintained over the entire span of intended operating temperatures.

The choice of bonding material in the thermistor is critical. It must produce ohmic contact, it must possess the proper expansion characteristics and, of course, it must perform the very difficult feat of bonding diamond to the remainder of the assembly. The bond between the diamond and the electrically conductive lead, or if a header is used, the bond between the diamond and the header material, must provide an ohmic or non-rectifying contact over the entire bonding surface of the diamond. The bonding material should have a coefficient of expansion equal to or greater than both the diamond and the refractory material in which the thermistor is encased. This is because almost every refractory material has a greater coefficient of expansion than diamond. If the bonding material had a lower coefficient of expansion than the diamond or the refractory material, then at elevated temperatures there would be a loss of electrical contact or at least erratic electronic behavior not characteristic of the sensing element but rather of the resulting contact phenomena. The bonding material therefore compensates to a certain extent for the sharp difference in coefficient of expansion between the diamond and the glass or other material from which the envelope is made. It has been found that certain alloys of palladium are particularly effective for bonding the crystals to the leads.

In their preferred form, the diamond crystals are rectangular prisms, or even more preferably, substantially cubic in shape. Such shapes provide two opposite parallel flat surfaces to which the electrically conductive leads are bonded. This configuration facilitates production and provides for reproducibility and commercially acceptable yields. Synthesis of the diamond crystals of the invention necessarily requires very precise control of growth conditions not only because of the foregoing shape requirements but also because it involves the introduction of homogeneously distributed very small but precise quantities of the so-called dopant into the host crystal, while the crystal itself is being grown under extremely high pressure and temperature conditions. In order to obtain the precise control over level and uniformity of dopant in the diamond crystal, especially at the low levels required to produce commercially acceptable thermistor products, the crystals should be grown relatively slowly. Diamond growth conditions which have been found to produce optimum shape crystals and dopant content for purposes of the invention comprise a pressure of from about 45 to about 60 kilobars and a temperature of from about 1100 to about 1700° C., in the presence of a dopant material homogeneously mixed with a catalyst for diamond growth. It will, of course, be recognized that the choice of a pressure and temperature is dependent on the specific catalyst and dopant used, the required level of doping, the desired shape of the diamond crystal and the degree to which reproducible properties are required for the thermistor devices. Generally, the process of introducing a dopant material such as boron into diamond during diamond growth is shown, for example, in U.S. Patent 3,148,161—Wentorf et al. which issued on Sept. 8, 1964. The disclosure of this patent is herein incorporated by reference.

Dopants which may be used in preparing the diamond crystals of the invention may, for example, be boron, aluminum and beryllium. The amount of dopant will ordinarily range from about 0.001% to about 1.0% by weight of the diamond. These limits will vary within this range for a specific dopant and will also depend upon the desired electronic characteristics. The amount of boron dopant in diamond, for example, should be from 0.001% to about 0.15% by weight. The source of the dopant material is preferably a high purity dopant in its elemental form.

In order to obtain satisfactory thermistor characteristics, the dopant must be homogeneously dispersed throughout the diamond crystal. To obtain such uniform dopant level, it is essential that the dopant be homogeneously dispersed throughout the growth system. This is done preferably by homogeneously mixing the dopant with the catalyst. If this homogeneous dispersal throughout the growth system is not attained, the dopant level in the crystals produced in the growth process will differ from crystal to crystal and within each crystal, and as a result consistent temperature-resistivity characteristics will not be obtained. For the foregoing reasons, it is preferred that the dopant be introduced during crystal growth.

After preparing the semiconducting single crystals, the crystals, as well as the remaining components of the thermistor assembly, are cleaned, leads are attached to two faces of the crystals so as to produce ohmic contacts, and the crystals and leads are encapsulated in a refractory envelope in a non-oxidizing atmosphere. The refractory material should have a mechanical working temperature above the intended maximum operating temperature of the thermistor, preferably above 800° C. The mechanical working temperature in the case of glass is represented by its strain point.

It has been found preferable to encapsulate the crystal and the immediately adjoining portion of the leads in a refractory envelope such as glass to prevent oxidation from occurring in the bonding material for the crystal and in the weld area between header and lead, if a header is used. The envelope also serves to lend mechanical stability and to prevent crystal oxidation.

More specifically, the process of thermistor assembly is carried out as follows. All components of the thermistor assembly are first thoroughly cleaned chemically so as to remove catalyst or other impurity from the surface of the diamond. Such cleaning is necessary both in order to obtain a satisfactory mechanical bond to the crystal in the thermistor device and also to obtain the necessary stable and reproducible electrical characteristics in the thermistor. This may be accomplished by an initial cleaning of the diamond with a strong acid, recleaning the crystal and cleaning the remaining thermistor components with suitable solvents to remove grease, and drying.

After cleaning, the lead may be directly attached to the surface of the crystal by a variety of bonding techniques, such as alloying, diffusion bonding, thermal compression, ultrasonic welding or nailhead bonding. If a header is used, the bonding material may first be deposited on the header by evaporation, in the form of a slurry, or by placing a preformed alloy disc on the header and firing in a non-oxidizing atmosphere. Suitable crystal bonding and contacting alloys are gold-nickel-chromium, iron-cobalt-nickel sold under the trademark Kovar, palladium-nickel and palladium-nickel-chromium. The latter palladium alloys are the preferred bonding materials of the invention. Suitable materials from which the electrical leads themselves may be made are tungsten, molybdenum, or Kovar.

The components of the thermistor, including the diamond crystal, the header containing the deposited bonding material, the leads and a glass tubing for encapsulation are then placed in a fusing station for assembly. The glass used for encapsulation must be a high temperature glass, such as Corning's aluminosilicate glass 1723 or equivalent. The fusing station should be purged so that the components of the thermistor are sealed in an atmosphere which is non-oxidizing. This atmosphere must be an inert gas such as argon, helium or nitrogen, an evacuated atmosphere or a reducing atmosphere such as hydrogen or forming gas. The gases should preferably be freed from oxygen and moisture to achieve a dew point of less than $-73°$ C. A pressure of from 5 to 3500 p.s.i.g. is then applied to the ends of the leads while the sides of the leads are supported if necessary, the specific pressure depending on the bonding material used. The components are then heated to about 900° to 1250° C. to seal the thermistor and bond the components into a composite device.

Finally, the composite assembly may be further encapsulated in a high temperature refractory material to protect the ends of the headers from excessive oxidation during operation of the thermistor at elevated temperatures. A suitable material for encapsulating the entire assembly is that sold under the trademark Pyroceram. However, any glass, capable of withstanding the operating temperature range of the thermistors, may be used.

The following examples illustrate the practice of the invention. A belt-type apparatus of the type disclosed in the aforementioned U.S. Patent 3,148,161 was used for crystal growth in Example 1.

Example 1

A diamond crystal was prepared by utilization of the reaction cell configuration shown in FIG. 3 of the drawing. The reaction vessel 10 comprised a pyrophyllite cylinder 11. Placed concentrically within the cylinder were a nickel tube 12 and a graphite tube 13 adjacent to each other and centered in the reaction vessel. Graphite pellets 14 and catalyst discs 15 were then alternately placed to fill the cylindrical space, along and over the entire length of the nickel and graphite tube. The nickel-iron catalyst discs containing the homogeneously dispersed high purity boron were typically from .005 inch to 0.010 inch thick. Graphite may be any high purity graphite. The boron was added in an amount of 0.1% by weight of catalyst and dopant. A plug of graphite 16 fits in the upper and lower end of the assembly so as to contain the graphite and catalyst within the reaction vessel. Electrically conductive end discs 17 were provided to carry current to the graphite tube and through the graphite-catalyst assembly. This type of reaction vessel provides for heating of the specimen directly, i.e., by having the current flow through the specimen itself.

The assembly was then placed in the press apparatus and subjected to a pressure of about 50 kilobars and subsequently heated to a temperature of 1400° C. The assembly was held at these conditions for ten minutes, after which the temperature was brought down by shutting off the current supply, after which the pressure was slowly reduced to atmospheric pressure and the sample removed from the pressure vessel. The semiconducting crystals were then recovered from the sample by chemically removing the graphite, catalyst metal and the remaining pyrophyllite by dissolving in mixtures of sulphuric and nitric acid, hydrochloric and nitric acid and diluted hydrofluoric acid respectively in standard proportions.

Example 2

The diamond crystals prepared as above were then size- and shape-separated. Particular shapes were grouped into sizes only microns apart. This close control is very essential for the manufacture of devices the characteristics of which, at least in part, depend on the actual size of the active element. The headers with the leads welded thereto were then metal-coated with an alloy of Pd-Ni-Cr (61.9% Pd, 33.3% Ni and 4.8% Cr by weight). The crystals as well as the Kovar leads and metal-coated molybdenum headers and encapsulating glass were cleaned with an organic solvent to remove any grease or organic material. The parts were then dried in a 100° C. air ambient.

The parts of the assembly—headers and leads, crystal and glass in the form of a small cylinder—were assembled in appropriate fixturing and placed inside the hot zone of a heater element which was surrounded by a vacuum-tight gas shield, which enabled the alloying of the bonding material and the crystal and simultaneous sealing of the glass to the leads to be done in a reducing atmosphere of forming gas having a dew point of less than −73° C. to prevent oxidation of the leads and bonding material, to promote sufficient bonding of the crystal to the lead as well as to provide a non-oxidizing environment for the crystal when sealed in the glass. A pressure of 2000 p.s.i.g. was applied during the bonding and sealing operation to bring about a complete simultaneous and ohmic contact between crystal and header.

It is important that the sealing gas be free of any oxygen since the oxidation characteristics of the crystal would severely influence the electronic behavior of the element at the maximum operating temperatures for which the devices of the invention are intended to be used. The sealing temperature of the components will vary from 950° C. to 1100° C., depending upon the alloy and encapsulating material used. The entire heating and cooling cycle, including time for appropriate annealing of the encapsulating glass, typically lasts no longer than 60 seconds.

The device was then removed from the sealing fixture and a small amount of Pyroceram No. 45 ceramic slurry was applied around and slightly beyond the encapsulated area and dried. This was followed by a curing cycle at 750° C. for 5 to 15 minutes. The application of this second refractory coating was only for purposes of protecting from oxidation the area where the leads are joined to the header and was therefore applied in this specific configuration. The Kovar leads were then cleaned of their oxide coating and plated with chromium. This has been found very effective in protecting the Kovar leads at the operating temperatures of the device for extended periods of time.

We have also successfully used leads made from precious metals such as platinum or palladium as well as base metals clad with a precious metal such as palladium-clad molybdenum. In these cases no protective chromium coating is needed.

The thermistor devices of the present invention should expand manyfold the usefulness of thermistor devices. This is a result not only of the greatly expanded operating temperature range of the present thermistors, but also because of their greater thermal and environmental stability and because they possess relatively linear resistivity versus temperature characteristics.

Typical curves illustrating resistivity versus temperature for natural IIb-type semiconducting diamond as contrasted with the corresponding characteristics of the thermistor device of Example 2 are illustrated in FIG. 2. As there shown, natural 11b semiconductive diamond possesses a curve whose slope renders it useful to a maximum temperature of about 350° C. This behavior is characteristic, within narrow limits, of all semiconducting natural diamond investigated to date. Because the curve changes from a negative to a positive slope at approximately 350° C., it is essentially useless as a thermistor material above such 350° C. temperature. In addition, its practical usefulness is severely limited beyond about 300° C. because of the very shallow slope beginning at this point and extending beyond. On the other hand, the resistivity curve of the diamonds of the invention possesses useful values from about minus 260° C. to over 800° C. Moreover, as can be seen from the drawing the curve is nearly linear over extended portions of this range.

Furthermore, thermistors of the invention possess the additional advantage of a virtual absence of any significant polarity effects or rectifying characteristics. In addition, the thermistors possess an extremely high thermal conductivity, resulting in excellent device responsivity. They are made of the hardest substance known, thus enhancing their capability of withstanding extremes of pressure. They possess extremely high resistance to chemical attack, hygroscopic effects, and abrasion. They possess the least susceptibility to radiation effects of almost any material known, of potential value in aerospace applications. They possess the highest Debye temperature implying thermal motion at the lowest frequency known for any substance at any one particular temperature, and as such are least subject to intrinsic thermal interference effects.

Thermistor devices containing single crystal cubic boron nitride as the resistance material are the subject of our copending application S.N. 543,588 filed of even date herewith and assigned to the same assignee as the present invention.

The foregoing is a description of an illustrative embodiment of the invention, and it is applicants' intention in the appended claims to cover all forms which fall within the scope of the invention.

What we claim as new and desire to secure by Letters Patent of the United States is:

1. A thermistor device comprising a semiconducting single crystal diamond and two electrically conductive leads bonded to said crystal to provide ohmic contact therewith, said crystal having homogeneously distributed throughout a dopant material selected from the group consisting of boron, aluminum and beryllium in an amount ranging from about 0.001% to about 1% by weight of the diamond, said thermistor having a coefficient of resistivity in excess of 0.05 over a continuous temperature range including room temperature in excess of 500° C.

2. A thermistor device comprising a semiconducting single crystal diamond, said crystal having at least two opposite parallel flat surfaces to each of which is bonded an electrically conductive lead having ohmic contact with said crystal, said crystal having homogeneously distributed throughout a dopant material selected from the group consisting of boron, aluminum and beryllium in an amount ranging from about 0.001% to about 1% by weight of the diamond, said thermistor having a coefficient of resistivity in excess of 0.05 over a continuous temperature range including room temperature in excess of 500° C.

3. The thermistor of claim 2 in which the crystal is sealed with a refractory material in a nonoxidizing atmosphere.

4. A thermistor device having a negative coefficient of resistivity comprising a semiconducting single crystal diamond, said crystal being in the shape of a rectangular prism, two opposite parallel flat surfaces of which are bonded to an electrically conductive lead to provide ohmic contact therewith, said crystal having homogeneously distributed throughout a dopant material selected from the group consisting of boron, aluminum and beryllium in an amount ranging from about 0.001% to about 1% by weight of the diamond, said thermistor having a coefficient of resistivity in excess of 0.05 over a continuous temperature range including room temperature in excess of 500° C.

5. The thermistor of claim 4 in which the crystal is in the shape of a cube.

6. The thermistor of claim 4 in which the crystal is sealed with a refractory material in a nonoxidizing atmosphere.

7. The thermistor of claim 4 in which the leads are bonded to the crystal with an alloy of palladium and nickel.

8. The thermistor of claim 4 in which the leads are bonded to the crystal with an alloy of palladium, nickel and chromium.

9. A thermistor device comprising a semiconducting single crystal diamond, two electrically conductive leads bonded to said crystal to provide ohmic contact therewith, said crystal having homogeneously distributed throughout a dopant material selected from the group consisting of boron, aluminum and beryllium in an amount ranging from about 0.001% to about 1% by weight of the diamond, said crystal and the adjoining portion of said lead being encapsulated in a non-oxidizing atmosphere with a refractory material, the electrically conductive leads being bonded to said crystal by a bonding material having a coefficient of expansion at least as great as that of the refractory encapsulating material, said thermistor having a coefficient of resistivity in excess of 0.05 over a continuous temperature range including room temperature in excess of 500° C.

10. The thermistor of claim 9 in which the electrically conductive lead is bonded to said crystal through a header material.

11. The thermistor of claim 9 in which the refractory material is glass having a strain point above approximately 800° C.

12. The thermistor of claim 10 in which the header material is selected from the group consisting of molybdenum and tungsten.

13. A process of producing a thermistor comprising growing semiconducting single crystal diamond, said crystal having homogeneously distributed throughout a dopant material selected from the group consisting of boron, aluminum and beryllium in an amount ranging from about 0.001% to about 1% by weight of the diamond, cleaning said crystal to remove substantially all impurities from the surface thereof, bonding two electrically conductive leads to said crystal to provide ohmic contact with said crystal and encapsulating, in the presence of a non-oxidizing atmosphere, said crystal and the adjoining portion of said leads in a refractory envelope.

14. A process of producing a thermistor comprising growing a semiconducting single crystal diamond, said crystal having homogeneously distributed throughout a dopant material selected from the group consisting of boron, aluminum and beryllium in an amount ranging from about 0.001% to about 1% by weight of the diamond, cleaning said crystal to remove substantially all impurities from the surface thereof, bonding conductive leads to opposite surfaces of said crystal while said leads are forced against said surfaces by applying a pressure of from 5 to 3500 p.s.i.g. through said leads, the bond between said crystal and said leads providing ohmic contact with said crystal and encapsulating, in the presence of a non-oxidizing atmosphere, said crystal and the adjoining portion of said leads in a refractory envelope.

15. The process of claim 14 in which the bond between the crystal and leads is an alloy of palladium and nickel.

16. A process of producing a thermistor comprising slowly growing a single crystal diamond in the shape of a rectangular prism from a non-diamond carbonaceous material at a pressure of from about 45 to 60 kilobars at a temperature of from about 1100 to 1700° C. in the presence of a dopant material homogeneously mixed with a catalyst for diamond growth and recovering a semiconducting diamond therefrom having homogeneously distributed throughout a dopant material selected from the group consisting of boron, aluminum and beryllium in an amount ranging from about 0.001% to about 1% by weight of the diamond and bonding two electrically conductive leads to said crystal to provide ohmic contact with said crystal, said thermistor having a coefficient of resistivity in excess of 0.05 over a continuous temperature range including room temperature in excess of 500° C.

References Cited

UNITED STATES PATENTS

| 2,271,774 | 2/1942 | Megow et al. | 29—619 X |
| 2,700,720 | 1/1955 | Torok | 29—619 |
| 3,037,266 | 6/1962 | Pfister | 29—619 |
| 3,148,161 | 9/1964 | Wentorf et al. | 252—503 X |
| 3,221,393 | 12/1965 | Sapoff et al. | 29—612 |
| 3,341,473 | 9/1967 | Loch | 338—22 X |

FOREIGN PATENTS

| 1,002,704 | 4/1965 | Great Britain. |

REUBEN EPSTEIN, *Primary Examiner.*

U.S. Cl. X.R.
29—612; 252—503